US008683266B2

(12) United States Patent
Migliasso et al.

(10) Patent No.: US 8,683,266 B2
(45) Date of Patent: Mar. 25, 2014

(54) METHODS AND DEVICES FOR CONFIGURATION VALIDATION OF A COMPLEX MULTI-ELEMENT SYSTEM

(75) Inventors: Raphael Migliasso, Toulouse (FR); Olivier Bastien, La Salvetat Saint-Gilles (FR); Miguel Estrada-Fernandez, Fonsorbes (FR)

(73) Assignee: AIRBUS Operations S.A.S., Toulouse (FR)

( * ) Notice: Subject to any disclaimer, the term of this patent is extended or adjusted under 35 U.S.C. 154(b) by 423 days.

(21) Appl. No.: 13/038,777

(22) Filed: Mar. 2, 2011

(65) Prior Publication Data

US 2011/0219267 A1    Sep. 8, 2011

(30) Foreign Application Priority Data

Mar. 3, 2010 (FR) .................................. 10 00872

(51) Int. Cl.
*G06F 11/00* (2006.01)

(52) U.S. Cl.
USPC ............... 714/37; 714/25; 714/30; 714/48

(58) Field of Classification Search
USPC ............. 714/25, 37, 30, 33, 47.1, 48, 57, 27
See application file for complete search history.

(56) References Cited

U.S. PATENT DOCUMENTS

| | | | |
|---|---|---|---|
| 5,579,511 A * | 11/1996 | Cavasa et al. .................... 703/27 |
| 5,832,503 A * | 11/1998 | Malik et al. ..................... 714/27 |
| 6,980,959 B1 | 12/2005 | Garrow et al. | |
| 7,373,556 B2 * | 5/2008 | Srivastava et al. ........... 714/47.1 |
| 2002/0194160 A1 | 12/2002 | Garrow et al. | |
| 2005/0004821 A1 | 1/2005 | Garrow et al. | |
| 2007/0074074 A1 * | 3/2007 | Curtis et al. .................... 714/25 |
| 2008/0097626 A1 * | 4/2008 | Reed et al. ...................... 700/30 |
| 2009/0125277 A1 | 5/2009 | Wetzer et al. | |
| 2010/0070804 A1 | 3/2010 | Bolignano et al. | |

FOREIGN PATENT DOCUMENTS

| | | |
|---|---|---|
| FR | 2 864 655 | 7/2005 |
| WO | WO 02/33619 A1 | 4/2002 |

OTHER PUBLICATIONS

French Preliminary Search Report issued Aug. 12, 2010, in French 1000872, filed Mar. 3, 2010 (with English Translation of Categories of Documents).
French Preliminary Search Report issued Aug. 12, 2010, in French 1000872, filed Mar. 3, 2010 (with English Translation of Categories of Cited Documents).

* cited by examiner

*Primary Examiner* — Joseph D Manoskey
(74) *Attorney, Agent, or Firm* — Oblon, Spivak, McClelland, Maier & Neustadt, L.L.P.

(57) ABSTRACT

The object of the invention is in particular the validation of configuration of a system comprising a plurality of elements, at least one reference being associated with each element of the said plurality of elements. After at least one reference key has been calculated (410) according to at least one expected reference of each element of the said plurality of elements, a theoretical configuration report of the said system, comprising the said at least one reference key, is generated (420). Similarly, at least one verification key is calculated (455) according to at least one reference of each element of the said plurality of elements, and a real configuration report of the said system, comprising the said at least one verification key, is generated (460). A configuration error is detected if the values of the said verification key and reference key of the said real and theoretical configuration reports are different.

16 Claims, 5 Drawing Sheets

METHODS AND DEVICES FOR CONFIGURATION VALIDATION OF A COMPLEX MULTI-ELEMENT SYSTEM

The present invention relates to validation of configuration of a system and more particularly to methods and devices for validation of configuration of a complex multielement system such as an aircraft, in order, in particular, to minimize the number of references to be verified during a check of the configuration of a system to reduce the duration of the checking operation and to limit the risks of errors.

Aircraft are complex systems typically comprising hardware elements and software elements. By way of illustration, the number of software locations in certain aircraft has increased from 20 in the 1980s to approximately 1,200 in 2007.

With a view to improvement, numerous elements are changed in the course of the useful life of an aircraft. These modifications may be imposed by the manufacturer to respond in particular to safety problems, or may be demanded by the airline company operating the aircraft, in order to make corrections to observed dysfunctionings and/or for purposes of development.

Thus, to take these improvements and these developments into account, the airline companies must regularly make hardware or software modifications to the aircraft that they operate.

Concerning the modifications described by the manufacturer of an aircraft, via a document generally referred to as the "*Service Bulletin*", the airline companies must systematically verify the proper application of these modifications via a check of the configuration. Such a check consists, for example, in comparing a configuration report generated by a system of an aircraft with an expected target configuration defined in documentation.

Since the function of generating configuration reports in an aircraft provides numerous operational advantages for the airline companies, the design of the aircraft integrates, for a given functional perimeter, an increasing number of references, also known as Part Number or P/N in English terminology, in the configuration reports.

However, since the functional perimeter of aircraft is expanding incessantly, the number of references for elements in the aircraft is also increasing. In addition, it is observed that, since the software elements can be changed easily, especially by downloading, they are generally updated at a frequency greater than that related to the change of hardware elements.

Thus, by virtue of these cumulative effects, the airline companies must therefore verify an increasing number of references during configuration checks of aircraft.

The invention makes it possible to resolve at least one of the problems described in the foregoing by reducing in particular the number of verifications to be performed during configuration checks aimed at verifying the conformity of configurations and/or the identification of non-conforming references.

One object of the invention is therefore a computer method for generating a real configuration report of a system permitting rapid verification of the configuration of the said system, the said system comprising a plurality of elements, at least one reference being associated with each element of the said plurality of elements, this method comprising the following steps, calculating at least one verification key according to at least one reference of each element of the said plurality of elements; and, generating a real configuration report of the said system comprising the said at least one verification key, a configuration error of the said system being detected if the value of the said verification key is different from the value of a reference key.

In this way the method according to the invention makes it possible to generate a configuration report of a system, this report being capable of being used to validate the configuration of the system rapidly and easily according to the value of the verification key present in this report.

Another object of the invention is a computer method for rapid verification of the configuration of a system comprising a plurality of elements, at least one reference being associated with each element of the said plurality of elements, this method comprising the following steps, calculating at least one reference key according to at least one expected reference of each element of the said plurality of elements;

generating a theoretical configuration report of the said system comprising the said at least one reference key; and, obtaining a real configuration report in conformity with the method described in the foregoing, a configuration error being detected if the values of the said verification key and reference key of the said real and theoretical configuration reports are different.

In this way the method according to the invention makes it possible to validate a configuration report of a system rapidly and easily according to the value of the verification and reference keys present in real and theoretical configuration reports.

Another object of the invention is a computer method for generating a real configuration report of a system permitting rapid identification of an erroneous reference of an element of the said system, the said system comprising a plurality of elements organized hierarchically by groups, at least one first group comprising at least one second and one third groups distinct from the said at least one first group, at least one reference being associated with each element of the said plurality of elements, this method comprising the following steps, calculating at least one first verification key associated with the said at least one second group according to at least one reference of each of the elements of the said system belonging to the said at least one second group;

calculating at least one second verification key associated with the said at least one third group according to at least one reference of each of the elements of the said system belonging to the said at least one third group;

calculating a third verification key associated with the said at least one first group according to at least the values of the said at least one first and at least one second verification keys; and, generating a real configuration report of the said system comprising the said at least one first, at least one second and one third verification keys, a configuration error being detected if the value of the said third verification key is different from the value of a third reference key, the location of the said configuration error being localizable by means of the said at least one first and at least one second keys and at least one first and at least one second reference keys.

In this way the method according to the invention makes it possible to generate a configuration report of a system, this report being capable of being used to validate the configuration of the system rapidly and easily according to the value of a limited number of verification keys present in this report and to identify the location of a configuration error rapidly and simply.

Another object of the invention is a computer method for rapid identification of an erroneous reference of an element of a system comprising a plurality of elements organized hierarchically by groups, at least one first group comprising at least one second and at least one third groups distinct from the said at least one first group, at least one reference being associated with each element of the said plurality of elements, this method comprising the following steps, calculating at least one first reference key associated with the said at least one second group according to at least one expected reference of each of the elements of the said at least one second group, at least one second reference key associated with the said at least one third group according to at least one expected reference of each of the elements of the said at least one third group, and a third reference key associated with the said at least one first group according to at least the values of the said at least one first and at least one second reference keys;

generating a theoretical configuration report of the said system comprising the said at least one first, at least one second and third reference keys; and obtaining a real configuration report in conformity with the method described in the foregoing, a configuration error being detected if the values of the said third verification key and third reference key of the said real and theoretical configuration reports are different, the location of the said configuration error being localizable by means of the said at least one first and at least one second keys.

In this way the method according to the invention makes it possible to validate the configuration of a system rapidly and easily according to the value of a limited number of verification and reference keys present in the real and theoretical configuration reports and to identify the location of a configuration error rapidly and simply.

Advantageously, the method for rapid verification of the configuration of a system additionally comprises a step of determining a theoretical configuration, the said theoretical configuration comprising at least one expected reference for each of the elements that must be present in the said system. In this way the method according to the invention permits an operator to validate the configuration of a system easily and rapidly without particular knowledge of the system.

Preferably the method additionally comprises a step of modifying the said theoretical configuration according to an indication to update at least one element of the said plurality of elements. In this way it is possible to validate the configuration of a system easily and rapidly after an update of an element thereof.

According to a particular embodiment, the method additionally comprises a step of generating a work order comprising at least the said theoretical configuration report. In this way it is possible to indicate an update of an element of a system to an operator and simultaneously to furnish the means for validating this update.

According to yet another particular embodiment, at least one of the said steps for calculating the said keys employs a calculation of cyclic redundancy check type, checksum type, error correction code type or cryptographic hash function type. The said steps of calculating the said keys are advantageously defined according to predetermined rules.

Another object of the invention is a computer program comprising instructions adapted to the employment of each of the steps of the method described in the foregoing when the said program is executed on a computer, a device comprising means adapted to the employment of each of the steps of the method described in the foregoing, as well as an aircraft comprising means adapted to the employment of each of the steps of the method for generating a real configuration report of a system such as described in the foregoing.

The advantages achieved by this computer program, this device and this aircraft are similar to those alluded to in the foregoing.

Other advantages, objectives and characteristics of the present invention become apparent from the detailed description hereinafter, provided by way of non-limitative example, with regard to the attached drawings, wherein:

FIG. 1 illustrates an example of a configuration report of a computer, generated in this case by the computer itself, according to the invention;

FIG. 2 schematically illustrates certain steps for generating a work order comprising a state of the expected configuration of a system after an update of one of its elements;

Figure 1:
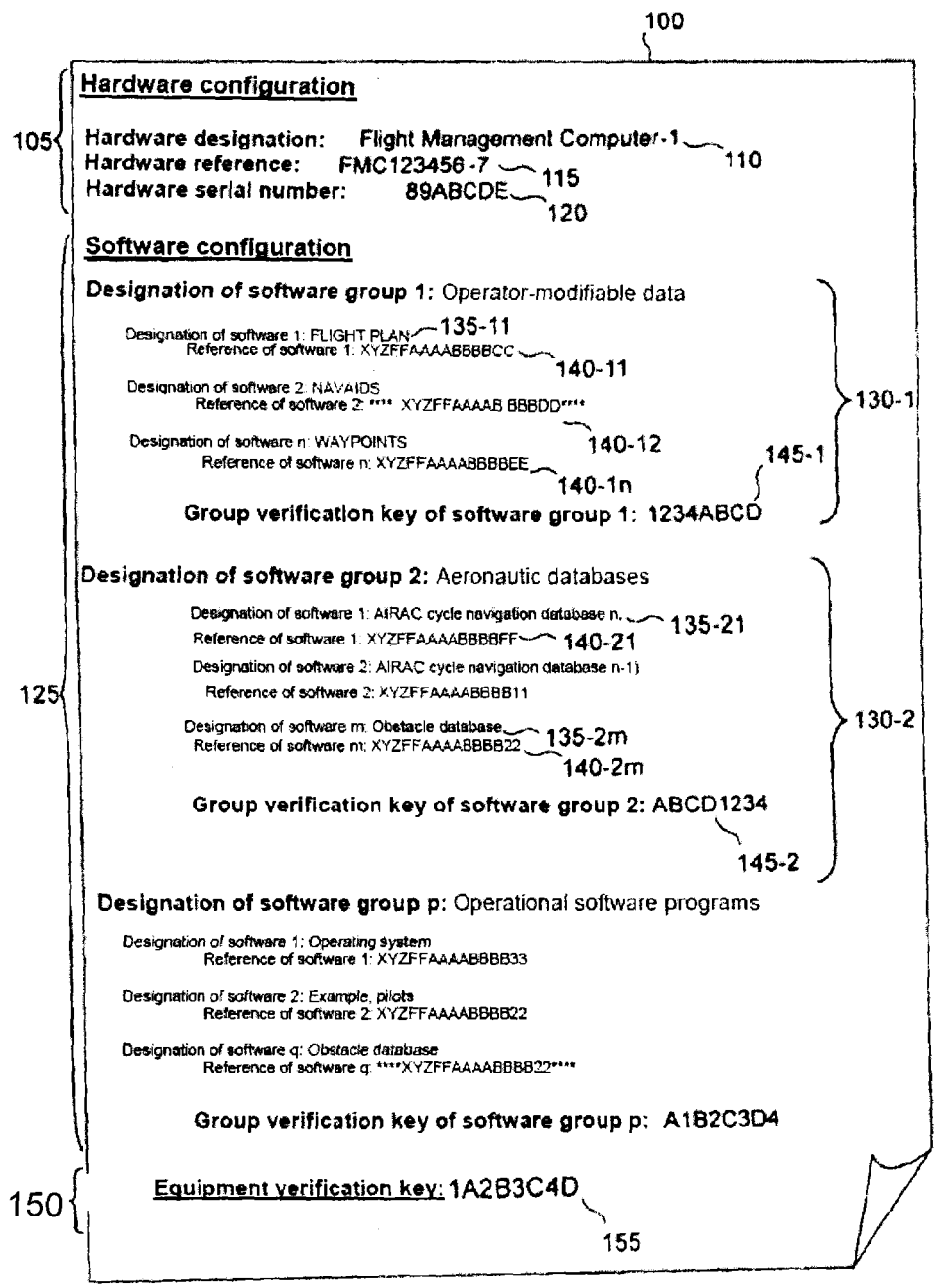

In the interests of clarity, the following description is essentially based on the equipment items and/or computers of an aircraft. However, the invention may be employed with other elements of an aircraft and more generally with any referenced element of multielement systems.

In general, the invention is intended to group elements according to predetermined criteria, hierarchically or otherwise, in order to represent a set of references by a sole reference linked to each of the references of the elements of the group. Such a sole reference may then be used to verify the configuration of the group that it represents. In this way, such grouping makes it possible to group sets of references but also groups of references.

By way of illustration, the groups may be determined in functional manner, by owner and/or by ATA chapter (abbreviation for Air Transportation Association in English terminology).

According to the functional grouping, all of the references of software elements of an equipment item linked to a particular function are classified in the same group. The grouping by owner has the object of grouping all of the references of software elements of an equipment item by suppliers. According to the grouping by ATA chapter, all of the references of software elements of an equipment item are classified in groups according to their ATA association.

Table 1 provided in the Appendix illustrates examples of grouping of software elements of a computer by function, by supplier or ATA chapter according to a hierarchical level and by function and supplier or ATA chapter according to two hierarchical levels.

The hierarchical level used, or the depth of the hierarchy, may be defined according to the maximum number of elements to be analyzed in a group.

The classification of references of elements into groups is advantageously transcribed visually onto the configuration report used by an operator to verify the configuration of the equipment item. In this way it is visually easy to localize a reference or a group of erroneous references within the set of checked elements, such as software elements hosted by a computer.

In this case one verification key is calculated per group of references in order to permit an operator to verify the conformity of the configuration of the group by comparing the verification key of the group with a predetermined reference key, furnished in a work order.

The verification key of each group, referred to as group verification key (CVG), is calculated and inserted into the configuration report accompanying the set of references of verified elements of the group in question.

Since the object of verification and reference keys is in particular to permit visual proof of the configuration of a system or of a subsystem, these keys are preferably verifiable visually. Advantageously they therefore should be composed of a limited number of characters, for example a number of characters smaller than 15. In addition, as regards the aircraft, the algorithm for calculating verification keys must be developed by taking into account the constraints of in-flight safety and operational availability associated with the equipment item hosting the elements under consideration.

By way of illustration, a verification or reference key may consist of a code of cyclic redundancy check type, referred to as CRC (or Cyclic Redundancy Check in English terminology), having a length of 32 bits. The key obtained in this way is composed of 8 hexadecimal characters that may be easily verified visually. In addition, the algorithms for calculating code of 32-bit CRC type make it possible to satisfy the most stringent constraints of in-flight safety and operational availability.

The value of a CRC is obtained from a given binary partition, by dividing its contents, expressed in the form of polynomial coefficients, by a fixed polynomial, referred to as generator polynomial. In simplified manner, the remainder of the polynomial division is the value used as CRC.

There exist numerous generator polynomials that make it possible to obtain CRCs, whose size, 32 bits, for example, may be used here. By way of illustration, currently used polynomial generators of 32-bit size are the following,

- CRC-32-IEEE 802.3, used in particular in the Ethernet protocol and in the MPEG-2 video compression algorithm;
- CRC-32C (Castagnoli), used in particular in the iSCSI Internet protocol to establish links between data-storage centers; and
- CRC-32Q, used in the aviation world, for example in connection with the aeronautic information exchange model AIXM.

As indicated in the foregoing, a CRC calculation is not the only numerical means of detecting errors. Thus, by way of example, the following functions may also be used,

- a checksum, also known by the name checksum in English terminology, used very widely in the world of information technology;
- an error correction code, for example a Reed-Solomon code, used in particular by the devices for reading CD disks (abbreviation for Compact Disk in English terminology) to detect and correct reading errors; and
- a cryptographic hash function, used in particular for authentication of users via the Internet network.

Similarly, a verification key may be calculated for a set of groups, for example for all groups comprising the references of software elements of a computer. Such verification keys, referred to as equipment verification keys (CVE), may also apply to other elements. Thus, for example, an equipment verification key may be determined according to all of the references of software elements of a computer and according to the reference of the computer itself.

Just as the group verification keys, the equipment verification keys permit an operator to verify the conformity of the software configuration of a computer simply, by visual comparison of the equipment verification key with a predetermined reference key furnished in a work order.

Since the constraints of visual verifiability, safety and operational availability applicable to a group verification key are typically the same as those linked to the equipment verification keys, the constraints described in the foregoing are applicable here. Thus an algorithm for calculating code of 32-bit CRC type may also be used for calculating an equipment verification key.

Advantageously, the references modified since a predetermined event are indicated in particular manner. In this way the operator, for example the person responsible for maintaining the software configuration of a computer, may visually review the references of software elements that have evolved since a moment defined by a particular event. Such an event may be defined in particular by the operator or may be linked to a flight phase, for example the startup of the first engine of the aircraft comprising the computer (this event is representative of the moment from which the maintenance operator is no longer able to modify the software configuration of a computer). When the event has occurred, the computer identifies its configuration and stores all of the modifications made to the configuration in memory.

The configuration report emitted by the computer then signals, in visual manner, the references of elements that have evolved since the event.

FIG. 1 illustrates an example of a configuration report 100 of a computer, generated in this case by the computer itself, according to the invention.

As illustrated, the report comprises three sections. A first section 105 relates to the hardware configuration of the computer. It comprises hardware designation 110 of the computer, reference 115 of the computer and serial number 120 thereof.

A second section 125 relates in this case to the software configuration of the computer. This section comprises as many subsections as there are groups of software elements. In this case it comprises p subsections. Each subsection, representative of a group of software elements, comprises references of software elements and preferably the designations of these elements.

By way of illustration, subsection 130-1 corresponds to a group comprising n software elements. Each software element i is described by a designation 135-1$i$ and a reference 140-1$i$. In this way, for example, the first software element of subsection 130-1 is described by the designation 135-11 and the reference 140-11.

As described in the foregoing and as reference 140-12 illustrates, the references may be presented in particular form, for example between the symbols <<****>> when a modification has been detected since a predetermined event.

A group verification key is associated with each subsection representing a group of software elements. Thus subsection 130-1 comprises group verification key 145-1. The latter is calculated according to all of the references of software elements belonging to the subsection, or in other words, in this case, on the basis of references 140-11 to 140-1$n$, by means, for example, of an algorithm for calculating code of CRC type.

In the same way, subsection 130-2 comprises designations 135-21 to 135-2$m$ and references 140-21 to 140-2$m$ of the software elements associated therewith as well as group verification key 145-2.

Finally, a third section 150 comprises an equipment verification key 155 linked to the set of references of software elements employed in the computer as well as to the reference of the computer itself. Thus, by way of illustration, the equipment verification key may be calculated according to an algorithm for calculating code of CRC type on the basis of references of all of the software elements, or in other words of references 140-*ji*, where j represents a group index varying from 1 to p and i represents an element index for each group, and of reference 115.

Advantageously, the employment of the invention makes it possible to verify the configuration of a system, for example of a computer, subsequent to an update of one of these elements and subsequent to dismantling and reassembling of this system.

Typically, when a software update must be made to an equipment item on board an aircraft whose configuration must be verified, the airline company operating this aircraft receives a service bulletin, generally referred to as *Service Bulletin* in English terminology, from the aircraft manufacturer. This service bulletin comprises the list of references of software elements that must be updated in the equipment item in question as well as a medium containing the associated software applications. Similarly, the airline company may generate software updates.

Furthermore, the configuration of aircraft is generally managed and tracked (or followed) on the ground by the airline companies by means of a reference document known as "*Universal Airplane Configuration Set*", which is supplemented upon receipt of each service bulletin. In this way it is possible, upon receipt of such a document, to prepare a work order comprising a state of the configuration expected after the update.

Figure 2:
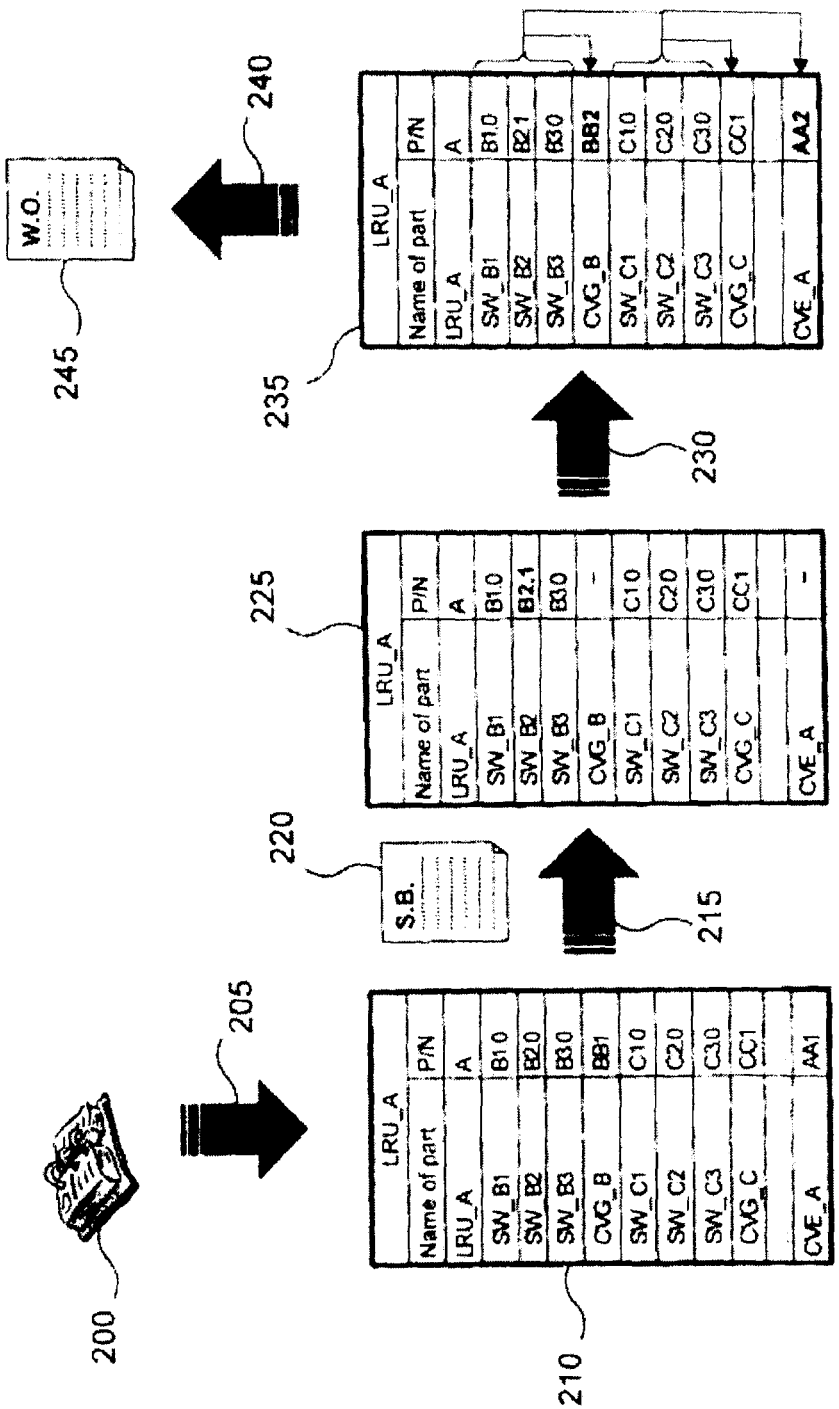

FIG. 2 schematically illustrates certain steps for generating a work order comprising a state of the expected configuration of a system after an update of one of its elements.

A first step has the object of extracting the theoretical configuration of an equipment item from a universal configuration set 200 (step 205). The extracted report, reference 210, is similar, for example, to that illustrated in FIG. 1. It comprises the designation of the equipment item (LRU_A), its reference (A) and the list of designations (SW_B1, SW_B2, etc.) and references (B1.0, B2.0, etc.) of software elements, preferably in the form of groups, as well as, for the equipment item and for each group, a verification key having a role of reference key. The reference keys are represented in this case by a name (CVG_B, CVG_C and CVE_A) and a value (BB1, CC1 and AA1).

It should be noted that the values of reference keys are not necessarily stored in memory in the universal configuration set. They may be recalculated during the extraction of a theoretical configuration report or at a later time.

These keys are calculated according to a scheme that in particular can be defined in a configuration file, for example in the form of predetermined rules expressed in the form of pseudo-equations such as the following:

$$CVG\_B = CRC\_32(SW\_B1, SW\_B2, SW\_B3)$$

$$CVG\_C = CRC\_32(SW\_C1, SW\_C2, SW\_C3)$$

$$CVG\_A = CRC\_32(CVG\_B, CVG\_C)$$

according to which the verification or reference key CVG_B is equal to the result of the function CRC 32 applied to the values SW_B1, SW_B2 and SW_B3, the verification or reference key CVG_C is equal to the result of the function CRC_32 applied to the values SW_C1, SW_C2 and SW_C3, and the verification or reference key CVG_A is equal to the result of the function CRC_32 applied to the values CVG_B AND CVG_C. It should be noted here that, because of the dependences between the rules, the order thereof is important. In addition, it is observed that these rules implicitly define the hierarchical organization of elements whose configuration is verified via their references.

In a subsequent step (step 215), the previously extracted theoretical configuration report is updated on the basis of a service bulletin (SB) 220 or of an equivalent document, Each reference of each software element that must be updated is then modified according to the instructions of service bulletin 220. The references of theoretical configuration report 225 obtained in this way are then in conformity with the expectations. By way of illustration, the reference of the element denoted by SW_B2 having the value B2.0 is modified and becomes B2.1. The other references are not modified here.

The verification or reference keys are then recalculated (step 230) to take the new references into account. As described in the foregoing, the verification or reference keys may be calculated by means of an algorithm for calculating code of 32-bit CRC type. The theoretical configuration report obtained after recalculation of the verification or reference keys is referenced 235.

It is observed here that the only modification made to the configuration of equipment item LRU_A concerns element SW_B2 of group B. Consequently, only group verification key CVG_B must be corrected and, by reason of this correction, so also must equipment verification key CVE_A. Group verification key CVG-C is not modified. However, while only the keys associated with elements whose references have been modified need to be recalculated, it is possible to recalculate all of the keys.

Thus, as illustrated in connection with report 235, group verification key CVG_B is calculated on the basis of references of elements SW_B1, SW_B2 and SW_B3, group verification key CVG_C is calculated on the basis of references of elements SW_C1, SW_C2 and SW_C3, and equipment verification key CVG_A is calculated on the basis of references of all of the elements employed in the equipment item (SW_B1, SW_B2, SW_B3, SW_C1, SW_C2, SW_C3, etc.).

On the basis of report 235, it is possible to generate (step 240) a work order 245 (WO, abbreviation for Working Order in English terminology) comprising the update instructions as indicated in service bulletin 220 as well as report 235 itself, which may be used by a maintenance operator as a theoretical configuration report for validating the aircraft configuration after the update of the equipment item under consideration.

The work order as well as the medium comprising the required software updates may then be transmitted to this maintenance operator to permit him to effect the required operations.

Figure 3:
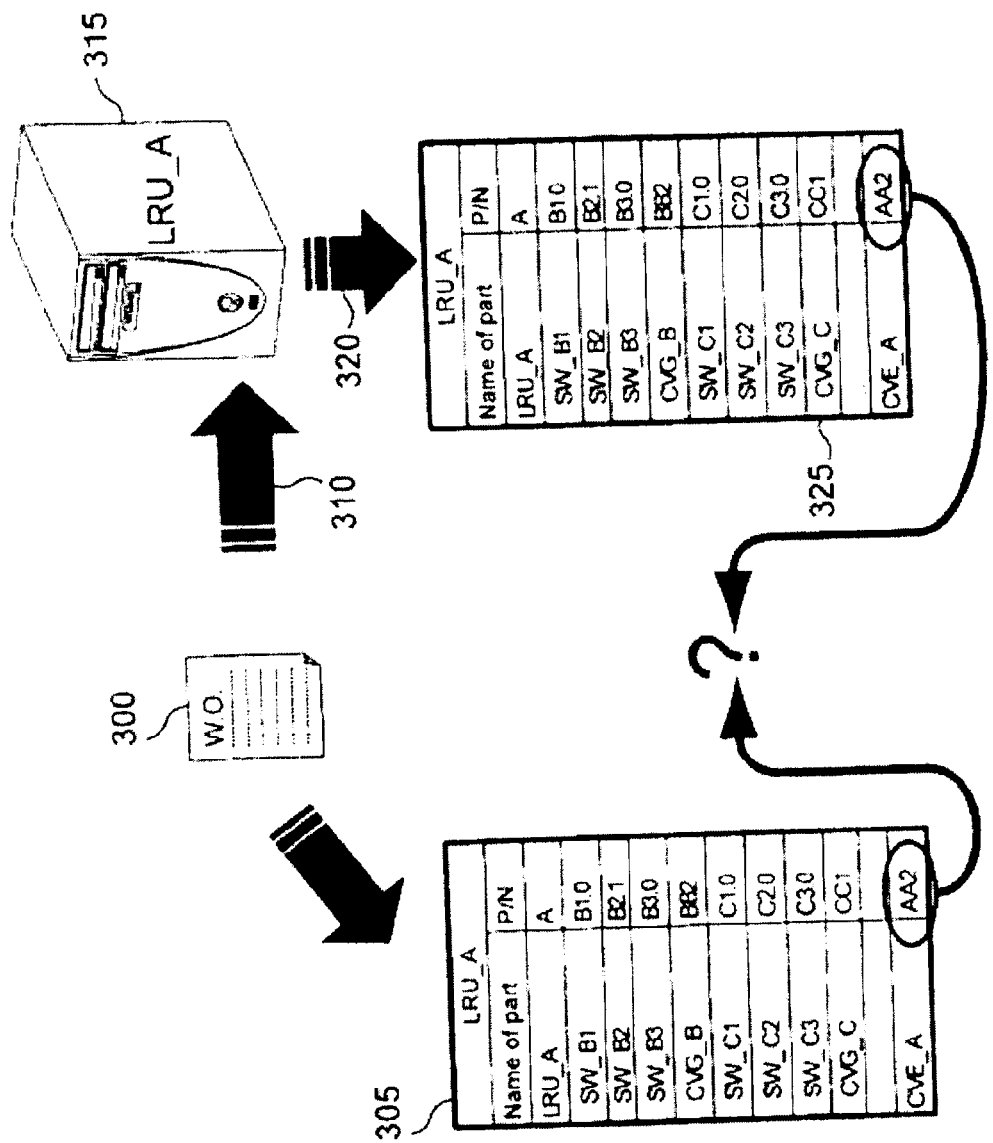
FIG. 3 illustrates certain steps effected for updating a software element of an equipment item of an aircraft and verifying the configuration of this equipment item after the update.

FIG. 3 illustrates certain steps carried out to update a software element of an equipment item of an aircraft and to verify the configuration of this equipment item after the update.

To effect such an update, a maintenance operator uses a work order as well as a medium comprising the required software updates such as described in reference to FIG. 2. For these purposes, the maintenance operator uses a device referred to as dataloader in English terminology, portable or on-board the aircraft, which makes it possible to transmit a software element to the equipment item to be updated. It also uses a tool that makes it possible to generate a real configuration report of this equipment item.

As indicated in the foregoing, a work order comprises, according to the invention, a theoretical configuration report that can be used to verify the real configuration of an equipment item according to a real configuration report. Thus work order 300 comprises theoretical configuration report 305. In addition, work order 300 comprises the instructions necessary to permit the maintenance operator to update (step 310) a software element of an equipment item, in this case LRU_A 315.

For these purposes, the maintenance operator begins by verifying that the reference of the equipment item that he will have to update indeed corresponds to the reference of the equipment item mentioned in his work order, or in other words by verifying in this case that the LRU_A installed in the aircraft indeed bears the reference A. In the affirmative, he may proceed to the software update of this equipment item by means of a dataloader and of media containing the software routines furnished with the work order. In this case, software SW_B2 having reference B2.1, furnished on the medium, is transferred to LRU_A, which receives it and installs it in place of software SW_B2 having reference B2.0.

After the update of one of its elements, the equipment item calculates the new verification keys according to its new configuration. These keys are calculated according to the same scheme as that used to calculate the verification keys of the theoretical configuration report. The configuration table of the equipment item is then updated.

When the equipment item has been updated, the maintenance operator may arrange for generation of a real configuration report (step 320). This may be in particular a command, accessible via a graphical interface of the equipment item under consideration or of the maintenance tool being used, addressed to a tool making it possible to generate a real configuration report of this equipment item. The real configuration report may also be generated automatically after each modification of the configuration of an equipment item. Typically, such a tool reads a configuration stored in memory in the equipment item.

Alternatively the verification keys may be calculated after the real configuration data of the equipment item under consideration have been obtained.

The real configuration report generated in this way and in which the verification keys have been calculated may then be compared with the theoretical configuration report. In this way the maintenance operator may proceed in dichotomic manner, starting by comparing the equipment verification key with the corresponding reference key, then, if they are not equal, the group verification keys with the corresponding reference keys and, for those that are not equal, the references of elements belonging to the groups whose verification keys are erroneous. This method therefore makes it possible to verify and validate, exhaustively, a complex configuration of an equipment item comprising numerous different software applications by a simple verification of values precalculated on the ground with corresponding values calculated by the equipment item or in connection with it.

Thus, according to the example of FIG. 3, the maintenance operator compares verification key CVE_A of the real configuration report and the corresponding reference key of the theoretical configuration report. Since these values are equal here, the maintenance operator deduces therefrom that all of the references of all of the elements of equipment item LRU_A are good, without needing to compare them one by one.

In the case of a fault of an equipment item of an aircraft, the airline company may proceed to an operation of removing and installing equipment items for the purpose of replacing them with another equipment item having an identical configuration. In the case of an equipment item hosting downloadable software applications, the maintenance operator not only must guarantee the agreement of the reference of the removed equipment item with the reference of the installed equipment item but must also guarantee the agreement of the references of the installed software applications.

The theoretical configuration of the equipment item to be replaced may be determined on the basis of a universal configuration set as described with reference to FIG. 2 (step 205). The theoretical configuration report, comprising reference keys, may then be used to generate a work order applying to replacement of the equipment item.

Similarly, after the replacement of an equipment item, it is possible to generate a real configuration report comprising verification keys. The verification keys of this real configuration report may then be compared with the corresponding reference keys of the theoretical configuration report to validate the replacement of the equipment item or to identify, rapidly, the element or elements that are not in conformity with the theoretical configuration report. The method in this case is similar to that described with reference to FIG. 3.

Figure 4:
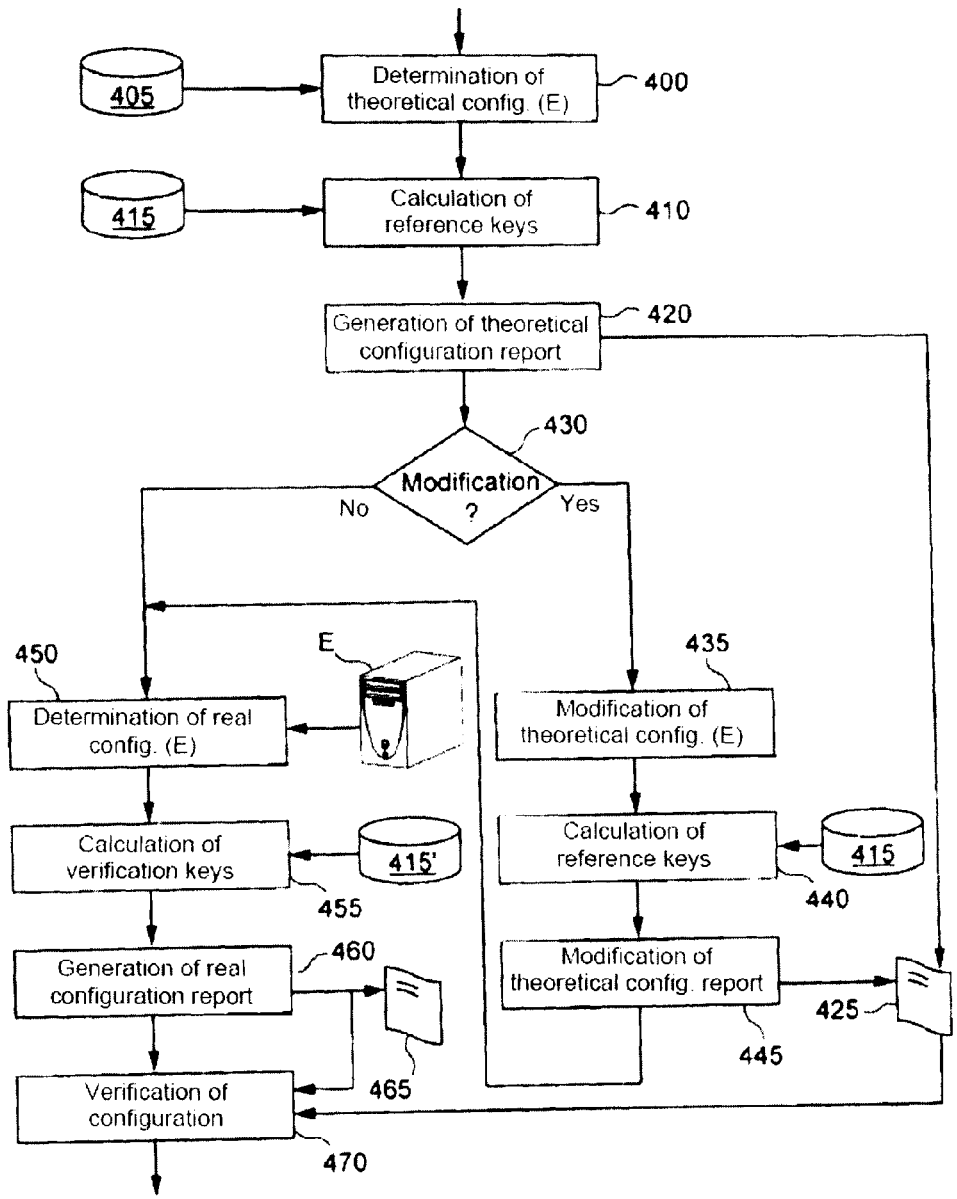
FIG. 4 illustrates certain steps of an example of an algorithm for verifying the configuration of an equipment item comprising software applications, especially after its replacement or the update of one or more software applications; and, FIG. 5 illustrates an example of hardware architecture adapted to employment of the invention or part of the invention.

FIG. 4 illustrates certain steps of an exemplary algorithm for verifying the configuration of an equipment item comprising software applications, especially after replacement thereof or the update of one or more software applications.

A first step (step 400) is intended here to extract the configuration data of an equipment item E on the basis of a universal configuration set stored in memory in database 405. These configuration data are then used to calculate reference keys (step 410) according to predetermined rules, in this case stored in memory in database 415. These rules are, for example, similar to those described in the foregoing.

The configuration data of equipment item E and the associated reference keys are then grouped within a theoretical configuration report 425 (step 420). This theoretical configuration report is similar to that illustrated in FIG. 2 bearing the reference 210.

A test is then performed (step 430) to determine whether or not the theoretical configuration of equipment item E must be modified (step 430), especially to update certain of its elements. Such an update may be imposed by the manufacturer of the equipment item or of the device in which it is installed, especially via a service bulletin, or by the operator of this device.

If a modification of the theoretical configuration must be effected, the theoretical configuration of equipment item E is modified (step 435). The modification may be achieved manually by an operator or automatically on the basis of a document such as a service bulletin. The modification is effected in this case in theoretical configuration report 425 and, preferably, in the universal configuration set. The reference keys are then recalculated (step 440) on the basis of rules used in the foregoing and defined in database 415 in order to take the modifications made into account. The theoretical configuration report is consequently modified (step 445).

The steps described in the foregoing (steps 400 to 445) are preferably carried out in an information technology system on the ground belonging to the operator of the device comprising equipment item E, to its manufacturer or to a third party.

If the theoretical configuration of equipment item E does not have to be modified (step 430), or after it has been modified and the theoretical configuration report has been modified (steps 435 to 445), the real configuration of equipment item E is determined (step 450). The verification keys linked to the real configuration of this equipment item are then calculated according to rules used to calculate the reference keys contained in the theoretical configuration report. These rules are stored in memory in this case in database 415'. The real configuration data of equipment item E and the associated verification keys are then used to generate a real configuration report 465 (step 460).

The steps of determining the real configuration of equipment item E, of calculating the associated verification keys and of generating the real configuration report (steps 450 to 460) are preferably performed in equipment item E or in an equipment item linked locally thereto (for example, a portable equipment item or another equipment item of the device comprising equipment item E).

The real configuration of equipment item E is then verified by comparing the real and theoretical configuration reports (step 470), or in other words by comparing the verification keys with the corresponding reference keys.

For legal reasons, step 470 is typically carried out by a maintenance operator. However, this step may nevertheless be automated to identify the element or elements whose references are not in conformity with the theoretical configuration report. Such automation may be based in particular on an algorithm for exploration of hierarchical structures.

Figure 5:
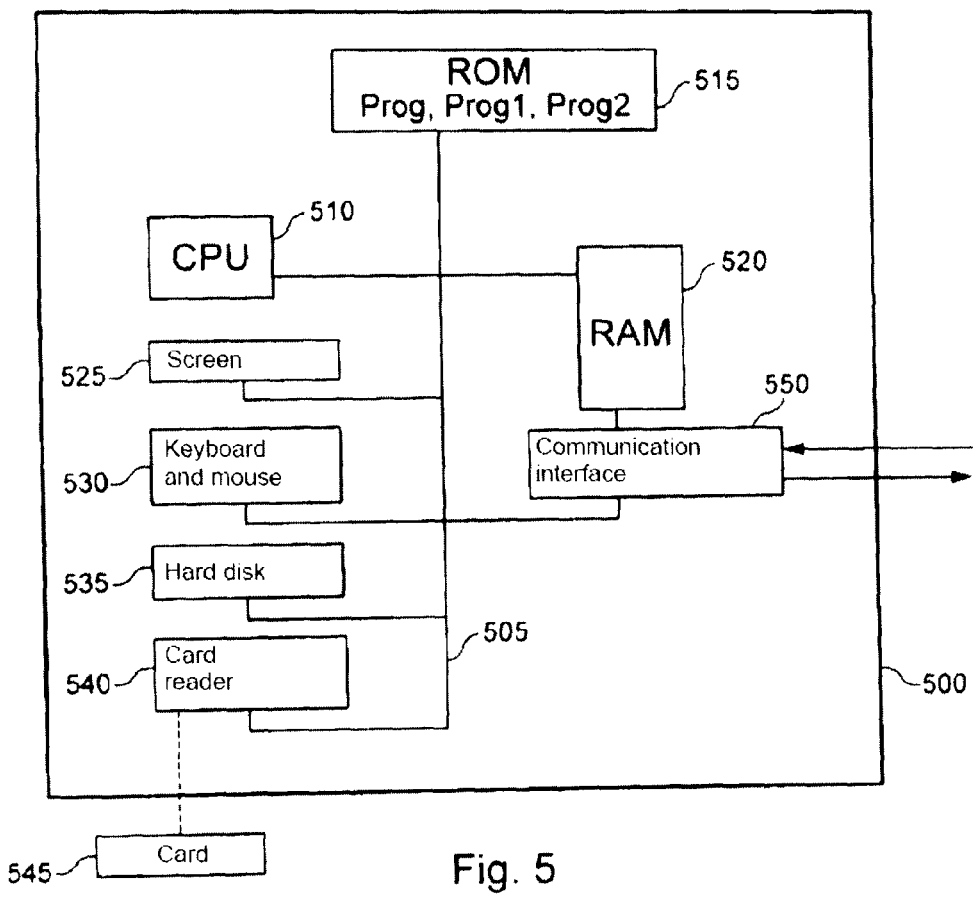

FIG. 5 illustrates an example of hardware architecture, for example a server, a computer or an on-board computer, adapted to employ the invention, especially steps 400 to 445 and/or steps 450 to 470 of the algorithm shown in FIG. 4. In this case, device 500 is provided with a communication bus 505, to which there are connected:
- one or more central processing units or microprocessors 510 (CPU, abbreviation for Central Processing Unit in English terminology);
- a read-only memory 515 (ROM, acronym for Read Only Memory in English terminology, which may comprise the programs (prog, prog1 and prog2) necessary for employment of the invention;
- a random access memory or cache memory 520 (RAM, acronym for Random Access Memory in English terminology), comprising registers adapted for recording variables and parameters created and modified during execution of the aforesaid programs; and,
- a communication interface 550, adapted for transmitting and receiving data.

Preferably device 500 also has the following elements:
- one or more display units 525 making it possible to display data and capable of functioning as a graphical interface with the user who will be able to interact with the programs according to the invention, by means of a keyboard and a mouse 530 or another pointing device such as a touch screen or a remote control;
- a hard disk 535, capable of containing the aforesaid programs, information items to be processed according to the invention, a universal configuration set, a theoretical and/or real configuration report and/or rules for calculating verification keys; and,
- a memory card reader 540 adapted for receiving a memory card 545 and reading therein or writing therein data processed or to be processed according to the invention.

The communication bus permits communication and interoperability between the different elements included in device 500 or connected thereto. The representation of the bus is not limitative and, in particular, the central unit is capable of communicating instructions to any element of device 500 directly or by way of another element of device 500.

The executable code of each program permitting the programmable device to employ the processes according to the invention may be stored, for example, on hard disk 535 or in read-only memory 515.

According to one variant, memory card 545 may contain information items, especially information items to be processed according to the invention, as well as the executable code of the aforesaid programs, which code, once read by device 500, is stored on hard disk 535.

According to another variant, it will be possible to receive, at least partly, by way of interface 550, the executable code of the programs and the information items to be processed according to the invention, to be stored in a manner identical to that described in the foregoing.

More generally, it will be possible to load the program or programs as well as the information items to be processed according to the invention into one of the storage means of device 500 before they are executed.

Central unit 510 will command and direct the execution of instructions or portions of software code of the program or programs according to the invention, which instructions are stored on hard disk 535 or in read-only memory 515 or else in the other aforesaid storage elements. During boot-up, the program or programs stored in a non-volatile memory, for example on hard disk 535 or in read-only memory 515, are transferred into random-access memory 520, which then contains the executable code of the program or programs according to the invention as well as registers for storing in memory the variables and parameters necessary for employment of the invention.

The invention makes it possible to reduce the number of checks to be performed with a ratio of N for detecting a configuration error and a ratio in K*N/Ln(N) for identifying the reference of an element not conforming with the theoretical configuration, K being linked to the implementation parameters used. In this way, for example, for a system comprising 1,000 references, the invention makes it possible to limit the number of checks to 1 for detecting a configuration error and to 30 for detecting an erroneous reference.

Naturally, to satisfy specific needs, a person skilled in the field of the invention will be able to apply modifications in the foregoing description.

APPENDIX

TABLE 1

| Examples of grouping criteria | Examples of groups | Examples of aeronautic application |
|---|---|---|
| Grouping by software function (one level) | Data modifiable by the operator<br>Aeronautic navigation databases<br>Operational software programs | Flight management computer (Flight Management)<br>Mission management computer |
| Grouping by owner/ATA chapter/system (one level) | Crew-warning function<br>Flight control function<br>Avionic ventilation function<br>Centralized maintenance function | Modular avionic platforms (for example: CPIOM/IOM modules)<br>"Open world" avionic platforms (for example: Network Server System) |
| Grouping by software function, then by owner/ | Software "pin programming" parameters | "Open world" avionic platforms (for example: Network Server |

TABLE 1-continued

| Examples of grouping criteria | Examples of groups | Examples of aeronautic application |
|---|---|---|
| ATA chapter (two levels) | Airplane parameters<br>Flight management<br>Crew warning<br>Monitoring<br>Mission management<br>Fuel management<br>Cockpit display management<br>Parameters for centralized maintenance<br>    Hydraulics<br>    Flight controls<br>    Sanitary water management<br>    Fuel management<br>    Engine management<br>Hosted applications<br>    Centralized maintenance<br>    Monitoring of the airplane condition<br>    Downloading and configuration report<br>    Management of takeoff/landing performance<br>Shared platform<br>    Operating system<br>    Basic services<br>    Fault diagnostics | System)<br>Modular avionic platforms (for example: CPIOM/IOM modules)<br>Multi-application display platforms in the cockpit of an aircraft (for example: Centralized Display System) |
| Grouping by owner/ATA chapter, then by function (two levels) | Flight management<br>    Operational software programs<br>    Parameterization files<br>    Navigation databases<br>    Data modifiable by the operator<br>Crew-warning management<br>    Operational software programs<br>    Parameterization files<br>Electrical distribution management<br>    Operational software programs<br>    Parameterization files<br>Shared platform<br>    Operating system<br>    Basic services<br>    Fault diagnostics | "Open world" avionic platforms (for example: Network Server System)<br>Modular avionic platforms (for example: CPIOM/IOM modules)<br>Multi-application display platforms in the cockpit of an aircraft (for example: Centralized Display System) |

The invention claimed is:

1. A computer method for generating a real configuration report of a system permitting rapid verification of configuration of the system, the system including a plurality of elements, at least one reference being associated with each element of the plurality of elements, the method comprising:
calculating one verification key from the at least one reference of each element of the plurality of elements;
generating the real configuration report of the system including the one verification key; and
detecting a configuration error of the system in response to a value of the one verification key being different from a value of a reference key.

2. The method according to claim 1, wherein the calculating of the one verification key calculates the one verification key using a calculation of cyclic redundancy check type.

3. The method according to claim 1, wherein the calculating of the one verification key is defined according to predetermined rules.

4. The method according to claim 1, wherein the calculating of the one verification key calculates the one verification key using a calculation of one of cyclic redundancy check type, checksum type, error correction code type, and cryptographic hash function type.

5. A computer method for rapid verification of configuration of a system including a plurality of elements, at least one reference being associated with each element of the plurality of elements, the method comprising:

calculating at least one reference key according to at least one expected reference of each element of the plurality of elements;
generating a theoretical configuration report of the system including the at least one reference key;
calculating one verification key from the at least one reference of each element of the plurality of elements;
generating a real configuration report of the system including the one verification key; and
detecting a configuration error in response to values of the one verification key and reference key of the real and theoretical configuration reports being different.

6. The method according to claim 5, wherein the calculating of the one verification key calculates the one verification key using a calculation of one of cyclic redundancy check type, checksum type, error correction code type, and cryptographic hash function type.

7. A computer method for generating a real configuration report of a system permitting rapid identification of an erroneous reference of an element of the system, the system including a plurality of elements organized hierarchically by groups, at least one first group including at least one second group and one third group distinct from the at least one first group, at least one reference being associated with each element of the plurality of elements, the method comprising:
calculating one first verification key associated with the at least one second group from at least one reference of each of the elements of the said system belonging to the at least one second group;

calculating one second verification key associated with the at least one third group from at least one reference of each of the elements of the system belonging to the at least one third group;

calculating a third verification key associated with the at least one first group according to at least values of the one first and one second verification keys;

generating a real configuration report of the system including the one first, one second and third verification keys; and detecting a configuration error in response to a value of the third verification key being different from a value of a third reference key, a location of the configuration error being localizable by the one first and one second keys and at least one first and at least one second reference keys.

8. The method according to claim 7, wherein the calculating of the third verification key calculates the third verification key using a calculation of one of cyclic redundancy check type, checksum type, error correction code type, and cryptographic hash function type.

9. A computer method for rapid identification of an erroneous reference of an element of a system including a plurality of elements organized hierarchically by groups, at least one first group including at least one second and at least one third groups distinct from the at least one first group, at least one reference being associated with each element of the plurality of elements, the method comprising:

calculating at least one first reference key associated with the at least one second group according to at least one expected reference of each of the elements of the at least one second group, at least one second reference key associated with the at least one third group according to at least one expected reference of each of the elements of the at least one third group, and a third reference key associated with the at least one first group according to at least values of the at least one first and at least one second reference keys;

generating a theoretical configuration report of the system including the at least one first, at least one second and third reference keys;

calculating one first verification key associated with the at least one second group from at least one reference of each of the elements of the system belonging to the at least one second group;

calculating one second verification key associated with the at least one third group from at least one reference of each of the elements of the system belonging to the at least one third group;

calculating a third verification key associated with the at least one first group according to at least values of the one first and one second verification keys;

generating a real configuration report of the system including the one first, one second and third verification keys; and detecting a configuration error in response to values of the third verification key and third reference key of the real and theoretical configuration reports being different, a location of the configuration error being localizable by the one first and one second keys.

10. The method according to claim 5 or claim 9, further comprising determining a theoretical configuration, the theoretical configuration including at least one expected reference for each of the elements that must be present in the system.

11. The method according to claim 10, further comprising modifying the theoretical configuration according to an indication to update at least one element of the plurality of elements.

12. The method according to claim 11, further comprising generating a work order including at least the theoretical configuration report.

13. The method according to claim 9, wherein the calculating of the third verification key calculates the third verification key using a calculation of one of cyclic redundancy check type, checksum type, error correction code type, and cryptographic hash function type.

14. A non-transitory computer-readable storage medium including computer executable instructions, wherein the instructions, when executed by a computer, cause the computer to perform a method for rapid verification of configuration of a system including a plurality of elements, at least one reference being associated with each element of the plurality of elements, the method comprising:

calculating at least one reference key according to at least one expected reference of each element of the plurality of elements;

generating a theoretical configuration report of the system including the at least one reference key;

calculating one verification key from the at least one reference of each element of the plurality of elements;

generating a real configuration report of the system including the one verification key; and detecting a configuration error in response to values of the one verification key and reference key of the real and theoretical configuration reports being different.

15. A device for rapid verification of configuration of a system including a plurality of elements, at least one reference being associated with each element of the plurality of elements, the device comprising:

a processor configured to
calculate at least one reference key according to at least one expected reference of each element of the plurality of elements,
generate a theoretical configuration report of the system including the at least one reference key,
calculate one verification key from the at least one reference of each element of the plurality of elements,
generate a real configuration report of the system including the one verification key, and
detect a configuration error in response to values of the one verification key and reference key of the real and theoretical configuration reports being different.

16. An aircraft comprising:
a device including a processor configured to
calculate at least one reference key according to at least one expected reference of each element of the plurality of elements,
generate a theoretical configuration report of the system including the at least one reference key,
calculate one verification key from the at least one reference of each element of the plurality of elements,
generate a real configuration report of the system including the one verification key, and
detect a configuration error in response to values of the one verification key and reference key of the real and theoretical configuration reports being different.

* * * * *